Patented Mar. 15, 1932

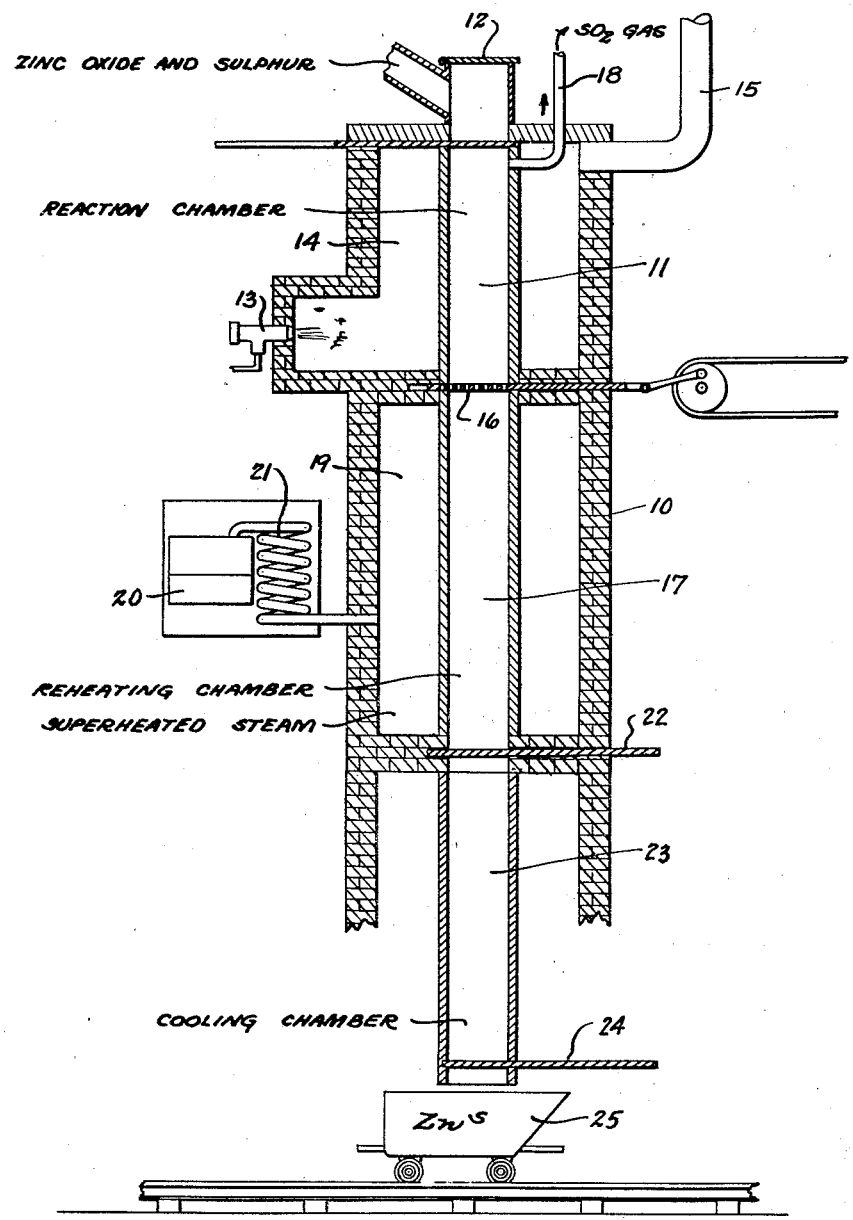

1,849,453

UNITED STATES PATENT OFFICE

EARL C. GASKILL, OF RED BANK, NEW JERSEY; JULIA VIRGINIA GASKILL ADMINISTRATRIX OF SAID EARL C. GASKILL, DECEASED

ZINC SULPHIDE AND MANUFACTURE THEREOF

Application filed December 4, 1926. Serial No. 152,539.

This invention relates generally to a process for making zinc sulphide.

As is well known, lithopone, which is used extensively in the manufacture of paint, is the product of double precipitation consisting of barium sulphate and zinc sulphide. The process consists of the simultaneous precipitation of barium sulphate and zinc sulphide as a result of the interaction of barium sulphide and zinc sulphate. The precipitated material thus obtained is amorphous in character, is completely lacking in hiding power and is therefore, in this condition, valueless as a pigment. This amorphous material, after being washed and dried is calcined in sealed furnaces or retorts from which air is excluded. At a temperature approximating 700° C. the material takes on a crystalline character in which individual crystals on the order of .5 of a micron in diameter are formed. The crystalline product thus produced has definite desirable optical properties, such as hiding power, brightness, and other qualities which are useful in the manufacture of paint. This product is the lithopone of commerce.

It has been heretofore considered that the calcining or heat treating operation to which the precipitated product is subjected produced some form of chemical action, not understood or explained, which in some way altered the character of the product in other ways than in the mere formation of crystals. It has also been considered that the two ingredients, that is, the barium sulphate and the zinc sulphide, played equivalent parts in the resulting product, each contributing its full share of the qualities whereby the desired optical effects were obtained which rendered the product useful in the manufacture of paint.

I have found that this conception of the nature of the product produced by the calcination of the amorphous mixture of barium sulphate and zinc sulphide is erroneous and that the desirable optical effects produced in the calcined material are characteristic of the zinc sulphide crystals only and are completely absent from the barium sulphate content of the product. Having ascertained this condition, that is, that the desirable qualities, existing in lithopone which made this material useful as a pigment, resided solely in the zinc sulphide content and that the barium sulphate content of the mixture was wholly inert, I at once perceived the possibility of making use of zinc sulphide alone, that is, unmixed with barium sulphate, as a material adapted for use as a pigment in the manufacture of paint. A general object of the present invention is accordingly to provide a process for the manufacture of zinc sulphide in crystalline form for use for any purpose to which this product can be put and particularly for use as a pigment in the making of paint.

The invention comprises a process for the production of zinc sulphide in crystalline form and by a dry, as distinguished from a wet, method of treatment. As a result of a series of experiments carried out for the purpose of invention, I have found that it is possible to produce zinc sulphide in crystalline form by intermixing zinc oxide and pulverized sulphur in proportions in which there is an excess of sulphur over that required to satisfy the resulting reactions. The mixture is made by passing the two materials together through bolting cloth in the known manner and in placing the mixture thus obtained in closed muffles of iron or suitable refractory material. The contents of the muffles are then heated to approximately 700° C. until the sulphur dioxide formed is driven off through a port or vent provided for the purpose in the muffle. When the reaction is complete according to the equation $2ZnO + 3S = 2ZnS + SO_2$, the contents of the muffle are removed out of contact with the air and permitted to cool. Either before or after the contents of the muffle are transferred to the cooling chamber, the material is passed through a coarse bolting cloth screen. The screened material is then reheated to a temperature approximating 700° C. in an atmosphere of dry steam or other inert gas or by merely heating the material in a closed vessel maintained in a substantially filled condition with the powdered sulphide.

The object of the reheating referred to is to change the color of the material from a yellowish tint which it possesses when emerging from the muffle to a pure white having in a marked and substantial degree such desirable optical properties as color, brightness, smoothness, hiding power, light resistance, and fineness. For example, the resulting material, which is pure crystalline zinc sulphide, has approximately three and one half times the hiding power of the best lithopone of commerce. The reheating of the material appears to have a combined chemical and physical action on such impurities as may be present in the zinc oxide ingredient of the mixture from which the sulphide is formed. For example, sulphides of cadmium or lead are changed to the sulphate form in the reheating treatment, thereby producing white products. Also there has been noticed a tendency to distil away discoloring impurities which may be present because of the lower vaporizing point of such substances as compared with that of zinc.

In the practice of the invention, I find that it is desirable to make use of zinc oxide in finely divided form since the use of the basic ingredient in this form results in the production of the ultimate product, that is, zinc sulphide, in finely divided form also. The desirable optical properties of the product referred to are increased in proportion to the fineness of the crystals therein. The fineness of the zinc oxide which is used in initiating the process also results in the carrying out of the process by means of lower temperatures than would be necessary were a coarser oxide to be used.

I have found that the vapor pressure of a finely divided material is greater than that of a coarser material. Therefore, by making use of finely divided zinc oxide, a lower temperature can be used to correspondingly restrict the growth of the resulting zinc sulphide particles. It will be clear that with a higher temperature, the growth of the zinc sulphide particles would be greater. In the case of the fine zinc oxide, the temperature at which a complete reaction will take place is much lower than in the case of coarser zinc oxide and the ultimate result is that finer and more uniform zinc sulphide particles are produced as a result of the use of the finer grade of zinc oxide at the beginning of the process.

Other features of the invention will be hereinafter referred to.

In the drawing the single figure shown illustrates in diagrammatic form an embodiment of apparatus suitable for carrying out the process.

Referring to the drawing for a more detailed description of the invention, a closed furnace or muffle is shown at 10 in which the chamber 11 is adapted to be filled with a mixture of finely divided zinc oxide and pulverized sulphur in proportions in which there will be approximately a twenty-five per cent excess of sulphur over that needed to satisfy the reactions of the materials when heat is applied. A cover 12 is provided to prevent the access of air to the furnace chamber 11 and a source of heat, such as an oil or gas burner 13, produces combustion temperature in an annular chamber 14 surrounding the furnace chamber 11. A vent pipe 15 serves to convey away the burnt products of combustion. At the lower end of the furnace chamber 11 a shaking grate and pulverizing device 16 is mounted which is employed at the completion of the reaction in the furnace chamber 11, which converts the zinc oxide and sulphur into zinc sulphide and sulphur dioxide, to screen and to a considerable extent disintegrate the material and permit the same to pass downwardly into a reheating chamber 17. The furnace chamber 11 is preferably provided with a conduit 18 through which the sulphur dioxide gas may be passed to a suitable collector. The reheating chamber 17 is brought up to the desired temperature by means of superheated steam supplied to an annular chamber 19 surrounding the reheating chamber 17 and delivered from a boiler 20 and superheater 21.

It will be seen that the material undergoing treatment in the reheating chamber 17 is acted on in the absence of air or other oxidizing gas and, if desired, while the reheating operation is going on, another batch of material may be undergoing treatment in the reaction chamber 11 above, thereby increasing the efficiency and economy of operation of the process.

When the material in the reheating chamber 17 has reached the desired temperature approximately 700° C. or a dull red heat, the gate or valve 22 is opened and the material is permitted to descend into a cooling chamber 23 in which the material is cooled in the absence of air or other oxidizing agent. When brought to a desirable cool condition, the product is complete and the resulting zinc sulphide is characterized by its white crystalline character and the desirable optical characteristics hereinbefore referred to.

For many purposes the material is subjected to a griding or disintegrating operation which results in the separation of agglomerated crystals from each other. A material of the desired fineness, which is useful for many purposes, such as the manufacture of paint, is measured by the ability to pass through a 300 mesh screen. The individual crystals in the product described have a size approximating .2 to .5 of a micron.

It will be seen that I have thus provided a process or method for the manufacture of zinc sulphide which produces a poduct characterized by an exceedingly high degree of purity and freedom from deleterious substances which would affect the optical qualities of the material when used as a pigment. Zinc sulphide in crystalline form has heretofore been produced but only on a relatively small scale and through a wet process as distinguished from the dry process herein described. The older processes referred to resulted in a product which was never entirely free from substances which greatly restricted the use to which the product could be put. The method herein described of producing the material, because of the utilization of nonoxidizing conditions in the preparation of the product, insures the production of a material having the purity and freedom from deleterious substances referred to.

The cooled material may be discharged from the chamber 23 by way of the gate or valve 24 and received in a suitable receptacle 25 for transfer to a grinding mill or to storage as may be desired.

What I claim is:

1. The process for making zinc sulphide which comprises heating zinc oxide and sulphur in a chamber from which air is excluded.

2. The process for making zinc sulphide which comprises heating intermixed finely divided zinc oxide and pulverized sulphur in a chamber from which air is excluded.

3. The process for making zinc sulphide which comprises heating zinc oxide and sulphur in a closed chamber having a vent through which sulphur dioxide may be discharged, in cooling the solid product thus obtained, and in again heating and cooling the product.

4. The process for making zinc sulphide which comprises heating zinc oxide and sulphur in a chamber from which air is excluded, in cooling the solid product thus obtained, and in again heating and cooling the product.

5. The process for making zinc sulphide which comprises heating zinc oxide and sulphur in a chamber from which air is excluded, in cooling the solid product in a chamber from which air is excluded, and in again heating and cooling the product in an atmosphere from which oxygen is excluded.

6. The process for making zinc sulphide which comprises heating intermixed and finely divided zinc oxide and sulphur in a furnace chamber closed except for a vent through which sulphur dioxide may be discharged, in applying heat to the furnace chamber to bring the temperature up to approximately 700° C., and in transferring the solid product thus produced into a cooling chamber sealed against the access of air.

7. The process for making zinc sulphide which comprises heating intermixed and finely divided zinc oxide and sulphur in a furnace chamber from which air is excluded, in cooling the solid product thus formed in an atmosphere from which air is excluded, and in screening the material and subjecting it to reheating and cooling operations in an atmosphere from which air is excluded.

EARL C. GASKILL.